(12) United States Patent
Krittian (10) Patent No.: US 10,710,729 B2
(45) Date of Patent: Jul. 14, 2020

(54) METHOD AND SYSTEM FOR CONTROLLING THE PRESSURE IN AN AIRCRAFT CABIN

(71) Applicant: AIRBUS OPERATIONS GMBH, Hamburg (DE)

(72) Inventor: Sebastian Krittian, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 703 days.

(21) Appl. No.: 14/664,246

(22) Filed: Mar. 20, 2015

(65) Prior Publication Data
US 2015/0266585 A1    Sep. 24, 2015

(30) Foreign Application Priority Data

Mar. 21, 2014   (EP) ..................................... 14161066

(51) Int. Cl.
| | | |
|---|---|---|
| B64D 13/04 | (2006.01) | |
| B64D 13/02 | (2006.01) | |
| F16K 1/00 | (2006.01) | |

(52) U.S. Cl.
CPC ............. *B64D 13/04* (2013.01); *B64D 13/02* (2013.01); *F16K 1/00* (2013.01); *Y02T 50/44* (2013.01)

(58) Field of Classification Search
CPC ............ B64D 13/02; B64D 13/04; F16K 1/00
(Continued)

(56) References Cited

U.S. PATENT DOCUMENTS 2,249,914 A * 7/1941 Reichel .................. G01C 19/38
                                                       310/40 R
2,641,986 A * 6/1953 Arthur .................... B64D 13/02
                                                       454/72
(Continued)

FOREIGN PATENT DOCUMENTS

| CN | 1 386 103 A | 12/2002 |
| CN | 101 415 606 A | 4/2009 |

(Continued)

OTHER PUBLICATIONS

European Search Report for Application No. 14 16 1066 dated Sep. 18, 2014.
(Continued)

*Primary Examiner* — Steven B McAllister
*Assistant Examiner* — Allen R Schult
(74) *Attorney, Agent, or Firm* — Jenkins, Wilson, Taylor & Hunt, P.A.

(57) ABSTRACT

In controlling pressure in an aircraft cabin, during flight operation, an effective flow cross-sectional area of at least one outflow valve is controlled to adjust air flow exiting the cabin through the outflow valve so pressure within the cabin is controlled according to a predetermined cabin pressure control strategy. During flight operation of the aircraft, an effective flow cross-sectional area of at least one negative relief valve is controlled to adjust air flow entering the cabin through the negative relief valve so a negative differential pressure between the pressure within the aircraft cabin and an ambient pressure prevailing outside of the aircraft cabin is prevented from exceeding a predetermined threshold value. During ground operation of the aircraft, the effective flow cross-sectional area of the at least one negative relief valve is controlled to allow an equalization between pressure
(Continued)

within the cabin and ambient pressure prevailing outside of the aircraft.

11 Claims, 2 Drawing Sheets

(58) Field of Classification Search
USPC .......................................................... 454/73
See application file for complete search history.

(56) References Cited

U.S. PATENT DOCUMENTS

| | | | | |
|---|---|---|---|---|
| 2,701,514 A * | 2/1955 | Del Mar | ................ | B64D 13/04 244/59 |
| 3,740,006 A * | 6/1973 | Maher | ................... | B64D 13/02 244/1 N |
| 8,087,255 B2 | 1/2012 | Klimpel | | |
| 2002/0173263 A1 | 11/2002 | Petri et al. | | |
| 2004/0216792 A1 | 11/2004 | Bunn et al. | | |
| 2005/0151016 A1* | 7/2005 | Kelnhofer | ............ | B64D 13/02 244/129.1 |
| 2006/0019594 A1* | 1/2006 | Horner | ................... | B64D 13/02 454/74 |
| 2008/0283663 A1* | 11/2008 | Space | .................... | B64D 13/06 244/118.5 |
| 2009/0308978 A1 | 12/2009 | Kelnhofer | | |
| 2010/0096503 A1* | 4/2010 | Tanner | ................... | B64D 13/02 244/129.4 |
| 2010/0203819 A1* | 8/2010 | Horner | ................... | B64D 13/04 454/74 |
| 2010/0210201 A1* | 8/2010 | Dreisilker | ............. | B64D 13/02 454/74 |
| 2010/0291852 A1* | 11/2010 | Steinert | ................. | B64D 13/02 454/71 |
| 2011/0196540 A1* | 8/2011 | Engelhardt | ............ | B64D 13/06 700/278 |
| 2014/0014195 A1* | 1/2014 | Kawano | ................ | B64D 25/00 137/81.2 |
| 2014/0227956 A1* | 8/2014 | Steinert | ................. | B64D 13/02 454/73 |

FOREIGN PATENT DOCUMENTS

| | | |
|---|---|---|
| DE | 10 2006 016 541 | 10/2007 |
| GB | 734 631 A | 8/1955 |
| GB | 1 348 748 A | 3/1974 |
| WO | WO 2007/115811 | 10/2007 |

OTHER PUBLICATIONS

First Search for Chinese Application No. 201510125082.7 dated Apr. 26, 2016, retrieved from Global Dossier Sep. 14, 2018.
First Office Action for Chinese Application No. 201510125082/7 dated May 5, 2016.
Second Office Action for Chinese Application No. 201510125082.7 dated Nov. 15, 2016.

\* cited by examiner

METHOD AND SYSTEM FOR CONTROLLING THE PRESSURE IN AN AIRCRAFT CABIN

CROSS-REFERENCE TO RELATED APPLICATION

This application claims priority to EP 14 161 066.7 filed Mar. 21, 2014, the entire disclosure of which is incorporated by reference herein.

TECHNICAL FIELD

The disclosure herein relates to a method and a system for controlling the pressure in an aircraft cabin.

BACKGROUND

In an aircraft cabin, an aircraft air conditioning system known, for example, from DE 10 2006 016 541 A1 or WO 2007/115811 A1, ensures a necessary air exchange, control of the cabin temperature and cabin pressurization. The cabin internal pressure is controlled by a cabin pressure control system which comprises controllable air outlet valves arranged in the area of a skin of the aircraft fuselage. The cabin pressure control system usually comprises at least one outflow valve. Typically, the cabin pressure control system of a modern passenger aircraft is equipped with two or more outflow valves being disposed in a forward and an aft belly region of the aircraft.

During flight operation of the aircraft, the cabin pressure is adjusted as needed by appropriately controlling an effective outflow area of the at least one outflow valve. During ground operation of the aircraft, the outflow valve is fully opened in order to allow an equalization of the pressure within the aircraft cabin and the ambient pressure prevailing outside of the aircraft. In particular, the outflow valve usually is designed so as to ensure that, when the aircraft is on the ground, a residual differential pressure between the pressure within the aircraft cabin and the ambient pressure does not exceed 2 hPa. The pressure control function of the outflow valve during ground operation of the aircraft is decisive for the design of the outflow valve, in particular the maximum effective outflow area of the outflow valves and thus the overall size and weight of the outflow valves.

The cabin pressure control system further comprises at least one negative relief valve. The negative relief valve is opened in order to allow ambient air entering the aircraft cabin if, during flight operation of the aircraft, for example during a fast decent of the aircraft, the ambient pressure exceeds the cabin pressure. During ground operation of the aircraft, the negative relief valve has no function and is kept shut.

SUMMARY

The disclosure herein is directed at an object of providing a reliable method and system for controlling the pressure in an aircraft cabin, which allow a more lightweight and more flexible design of the cabin pressure control system.

This object is achieved by a method for controlling the pressure in an aircraft cabin as disclosed herein.

In a method for controlling the pressure in an aircraft cabin, during flight operation of the aircraft, an effective flow cross-sectional area of at least one outflow valve is controlled so as to adjust an air flow exiting the aircraft cabin through the outflow valve such that the pressure within the aircraft cabin is controlled in accordance with a predetermined cabin pressure control strategy.

In the method for controlling the pressure in an aircraft cabin, during flight operation of the aircraft, the effective flow cross-sectional area of the outflow valve thus is controlled in a similar manner as in conventional aircraft cabin pressure control methods so as to adjust a desired pressure within the aircraft cabin. The predetermined control strategy may for example involve a control of the effective flow cross-sectional area of the outflow valve in dependence on a set pressure value for the pressure within the aircraft cabin which may vary for example depending on the cruising altitude of the aircraft. For example, under the predetermined control strategy, the effective flow cross-sectional area of the outflow valve may be increased or decreased as required in order to adjust an actual pressure within the aircraft cabin to a cruising altitude dependent set pressure value.

Further, in the method for controlling the pressure in an aircraft cabin, during flight operation of the aircraft, an effective flow cross-sectional area of at least one negative relief valve is controlled so as to adjust an air flow entering the aircraft cabin through the negative relief valve such that a negative differential pressure between the pressure within the aircraft cabin and an ambient pressure prevailing outside of the aircraft cabin is prevented from exceeding a predetermined threshold value. Thus, similar to the effective flow cross-sectional area of the outflow valve, also the effective flow cross-sectional area of the negative relief valve is controlled in a similar manner as in conventional aircraft cabin pressure control methods so as to prevent the development of an undesired negative differential pressure between the pressure within the aircraft cabin and the ambient pressure. For example during a fast decent of the aircraft the effective flow cross-sectional area of the negative relief valve may be increased so as to allow ambient air entering the aircraft cabin in order to allow an equalization between the (higher) ambient pressure and the (lower) cabin pressure.

The negative relief valve may be designed to open passively when a negative differential pressure between the pressure within the aircraft cabin and the ambient pressure exceeds a predetermined threshold value. It is, however, also conceivable to actively open the negative relief valve, for example by a suitable drive unit, in order to allow an equalization between the (higher) ambient pressure and the (lower) cabin pressure when a negative differential pressure between the pressure within the aircraft cabin and the ambient pressure exceeds a predetermined threshold value. If, however, the cabin pressure is higher than the ambient pressure, the negative relief valve usually is kept in its closed state, i.e. the effective flow cross-sectional area of the negative relief valve is set to zero so as to prevent an air exchange between the aircraft cabin and the ambient via the negative relief valve.

Finally, a method for controlling the pressure in an aircraft cabin, during ground operation of the aircraft, involves the control of the effective flow cross-sectional area of the at least one negative relief valve so as to allow an equalization between the pressure within the aircraft cabin and the ambient pressure prevailing outside of the aircraft. Thus, unlike than in conventional aircraft cabin pressure control methods, in the method for controlling the pressure in an aircraft cabin according to the disclosure herein, during ground operation of the aircraft, the negative relief valve is used for equalizing the pressure within the aircraft cabin and the ambient pressure, i.e. in case a pressure difference between the pressure within the aircraft cabin and the ambient pressure exists while the aircraft is on the ground, the negative relief valve is opened until a sufficient pressure equalization is effected, for example until a residual differential pressure between the pressure within the aircraft cabin and the ambient pressure falls below a predetermined threshold value.

In the method for controlling the pressure in an aircraft cabin, the negative relief valve thus fulfils the double function to prevent the development of an undesired negative differential pressure between the pressure within the aircraft cabin and the ambient pressure during flight operation of the aircraft on the one hand, and to provide for an equalization between the pressure within the aircraft cabin and the ambient pressure prevailing outside of the aircraft during ground operation of the aircraft on the other hand. In other words, when the aircraft is on the ground, the negative relief valve is opened, preferably actively opened, whereas, during flight operation of the aircraft, the negative relief valve is controlled as described above, i.e. normally closed but opened, preferably passively opened, when a negative differential pressure between the pressure within the aircraft cabin and the ambient pressure exceeds a predetermined threshold value. As a result, it is no longer necessary to design the outflow valve for a ground operational case in which exclusively the outflow valve has to provide for an equalization of the pressure within the aircraft cabin and the ambient pressure. Instead, the design of the outflow valve can be adjusted to the flow cross-sectional area requirements during flight operation of the aircraft when the outflow valve serves to adjust the air flow exiting the aircraft cabin in order to appropriately control the pressure within the aircraft cabin. This allows an optimization of the design of outflow valve regarding the control of the pressure within the aircraft cabin during flight operation of the aircraft.

Simultaneously, the design of the negative relief valve does not require excessive adjustments, since the maximum effective flow cross-sectional area of the negative relief valve, which is designed in dependence on the required pressure equalization properties of the negative relief valve during flight operation of the aircraft typically is sufficient to also provide for the required equalization between the pressure within the aircraft cabin and the ambient pressure during ground operation of the aircraft. Thus, the method for controlling the pressure in an aircraft cabin does not require significant changes in the overall system architecture of the cabin pressure control system.

When the outflow valve is designed based on the flow cross-sectional area requirements during flight operation of the aircraft, the outflow valve can be of a much smaller and more lightweight design. This allows not only an advantageous reduction of the weight of the outflow valve, and a reduction of the size of the cut-out which has to be provided in the aircraft outer skin for installation of the outflow valve, but also a more flexible positioning of the outflow valve. A more flexible positioning of the outflow valve may make it possible to place the outflow valve directly where needed for air extraction thus allowing ducts and additional conveying structure, such as for example fans to be omitted. Furthermore, a more flexible positioning of the outflow valve may make the outflow valve more attractive for use in aircraft systems other than the cabin pressure control system, such as for example a cabin displacement ventilation system. If desired, an aircraft can be equipped with a plurality of outflow valves for supporting aircraft systems other than the cabin pressure control system and/or for increasing the overall system reliability of the cabin pressure control system without adding too much weight. Finally, a so-called runaway protection of the outflow valve for preventing an undesired depressurization of the aircraft cabin can be dispensed with.

In addition, a smaller outflow valve can be realized with a smaller amount of moving parts which leads to a reduction in the necessary maintenance efforts and an increase in the operation reliability of the outflow valve. Moreover, the outflow valve may be designed so as to allow a thrust recovery as will be explained in more detail below. An optimization of the outflow valve design in regard to the operation of the outflow valve during flight further may allow the realization of a more stable optimized cabin pressure control and a reduction of broad-band and tonal noise generated by the outflow under certain operational conditions. Hence, the comfort within the aircraft cabin may be increased. Finally, the overall operational reliability of a cabin pressure control system comprising an outflow valve having a smaller maximum flow cross-sectional area is increased due to the less significant effect of a failure of the outflow valve in view of a possible decompression of the aircraft cabin.

Basically, in the method for controlling the pressure in an aircraft cabin, the equalization between the pressure within the aircraft cabin and the ambient pressure prevailing outside of the aircraft during ground operation of the aircraft can be achieved exclusively by appropriately controlling the negative pressure relief valve, for example by controlling the negative pressure relief valve into a fully open state. It is, however, also conceivable to control, during ground operation of the aircraft, the at least one outflow valve and/or another valve such as, for example at least one air extraction valve into the fully open state so as to allow an equalization between the pressure within the aircraft cabin and the ambient pressure prevailing outside of the aircraft. The required pressure equalization during ground operation of the aircraft than still mainly takes place via the negative pressure relief valve, but is supported by the air exchange via the outflow valve. The pressure equalization during ground operation of the aircraft than may be achieved faster and more reliable. In addition, the contribution of the outflow valve to the pressure equalization process can be considered upon designing the negative relief valve, even if the maximum flow cross-sectional area of the outflow valve is smaller in size than that of a conventional outflow valve.

In a preferred embodiment of the method for controlling the pressure in an aircraft cabin, during ground operation of the aircraft, the effective flow cross-sectional area of the at least one negative relief valve is controlled so as so as to ensure that a residual differential pressure between the pressure within the aircraft cabin and the ambient pressure does not exceed 2 hPa. A threshold value for the differential pressure between the pressure within the aircraft cabin and the ambient pressure of 2 hPa complies with existing safety requirements. In case the outflow valve, during ground operation of the aircraft, is controlled into its fully open state as described above, the contribution of the outflow valve to the pressure equalization process preferably is considered upon controlling the effective flow cross-sectional area of the negative relief valve so as so as to ensure that a residual differential pressure between the pressure within the aircraft cabin and the ambient pressure does not exceed 2 hPa. In other words, in case the outflow valve, during ground operation of the aircraft, is controlled into its fully open state as described above, the effective flow cross-sectional area of the negative relief valve may be controlled in dependence on the contribution of the outflow valve to the pressure equalization process so as to ensure that pressure equalization via the negative relief valve and the outflow valve leads to a residual differential pressure between the pressure within the aircraft cabin and the ambient pressure which is lower than 2 hPa.

The negative relief valve may comprise an opening flap which is biased into a closed position with a predetermined biasing force by a biasing mechanism. The biasing mechanism may, for example, comprise at least one spring element. Preferably, the opening flap, in its closed position is arranged flush with a region of an aircraft skin surrounding the opening flap. In its open position, the opening flap may extend inwards with respect to the region of the aircraft skin surrounding the opening flap, i.e. the opening flap, in its open position, may extend into an interior of the aircraft. This design of the opening flap ensures that the negative relief valve, during flight operation of the aircraft, is closed unless a negative differential pressure between the pressure within the aircraft cabin and the ambient pressure prevailing outside of the aircraft cabin exceeds the biasing force applied to the opening flap by the biasing mechanism. If, however, a negative differential pressure between the pressure within the aircraft cabin and the ambient pressure exceeds the biasing force applied to the opening flap by the biasing mechanism, the opening flap, due to the higher ambient pressure acting on an outer surface of the opening flap as compared to the lower cabin pressure acting on an inner surface of the opening flap, is pivoted inwards, i.e. into the interior of the aircraft, against the biasing force of the biasing mechanism. Via the thus opened flow cross-sectional area of the negative relief valve ambient air may enter the aircraft cabin so as to provide for a pressure equalization between the aircraft cabin and the ambient.

It is, however, also conceivable to provide the negative relief valve with an opening flap which in its open position extends outwards with respect to the region of the aircraft skin surrounding the opening flap, i.e. during flight operation of the aircraft, in its open position extends into an air flow flowing along an outer surface of the aircraft skin. The negative relief valve then would be suitable to also take over at least a part of the functions of an emergency ram air inlet which, in an emergency, for example in the event of a failure of the aircraft air conditioning system, serves to supply ambient air to the aircraft cabin.

The negative relief valve preferably further comprises a drive mechanism which, during ground operation of the aircraft, drives the opening flap into an open position against the biasing force applied to the opening flap by the biasing mechanism. Basically, the drive mechanism, during ground operation of the aircraft, simply may drive the opening flap into a fully open position in order to allow the desired equalization between the pressure within the aircraft cabin and the ambient pressure prevailing outside of the aircraft to occur as fast as possible. It is, however, also conceivable that the drive mechanism, during ground operation of the aircraft, drives the opening flap into different positions so as to vary the effective flow cross-sectional area of the negative relief valve in order to control the pressure equalization process between the aircraft cabin and the ambient as desired. The movement of the opening flap may be stepwise or continuous.

The at least one outflow valve may comprises an air outflow channel having an acceleration portion. The air flow exiting the aircraft cabin through the outflow valve, upon flowing through the acceleration portion of the outflow channel, may be accelerated. By accelerating the air flow exiting the aircraft cabin through the outflow valve in the acceleration portion of the outflow channel, a thrust recovery function of the outflow valve may be realized. The acceleration portion of the outflow channel may comprise a Venturi pipe, i.e. a fixed pipe having a portion with a reduced flow cross-sectional area in a central section thereof. The air flow exiting the aircraft cabin through the outflow valve thus may be accelerated through fixed parts, whereas conventional outflow valves are equipped with moving parts. Thus, as regards the acceleration of the air flow exiting the aircraft cabin through the outflow valve, an outflow valve having fixed parts offers the better effect.

Preferably, the air flow exiting the aircraft cabin through the outflow valve, upon flowing through the acceleration portion of the outflow channel, is accelerated to approximately super-sonic speed. This provides for a wide range of operation with a low risk of pressure loss.

The air flow exiting the aircraft cabin and entering the acceleration portion of the outflow channel may be controlled by a control flap disposed upstream of the acceleration portion. The control flap may be a butterfly valve which may be designed so as to optimize the air flow in terms of both aeroacoustics and speed. The control flap may allow an active control of the air flow exiting the aircraft cabin and entering the acceleration portion of the outflow channel, i.e. may be moved, either stepwise or continuously, into different positions so as to vary the effective flow cross-sectional area of the outflow valve. It is, however, also conceivable to provide the outflow valve with a control flap which can be moved between a fully closed and a fully opened position only.

A direction of the air flow through the acceleration portion of the outflow channel preferably is substantially parallel to a direction of an air flow along an outer surface of an aircraft skin during flight operation of the aircraft. This may be achieved by arranging the acceleration portion of the outflow channel in such a manner that its longitudinal axis extends substantially parallel to the aircraft skin. An opening area of the acceleration portion of the outflow channel may extend substantially perpendicular to the air flow through the acceleration portion thus allowing an unhindered an undeflected air flow out of the acceleration portion into the ambient in order to provide for an effective thrust recovery. The acceleration portion may be connected to an opening provided in the aircraft skin for discharging cabin air from the interior of the aircraft via a connecting portion, a longitudinal axis of which may extend at an angle of approximately 25 to 65° relative to the direction of the air flow through the acceleration portion. In the connecting portion, the cabin air exiting the opening provided in the aircraft skin thus may be deflected in order to achieve the desired air flow through the acceleration portion in a direction substantially parallel to the direction of the air flow along an outer surface of an aircraft skin during flight operation of the aircraft.

A system for controlling the pressure in an aircraft cabin comprises at least one outflow valve, at least one negative relief valve, and a control unit. The control unit is adapted to control, during flight operation of the aircraft, an effective flow cross-sectional area of the at least one outflow valve so as to adjust an air flow exiting the aircraft cabin through the outflow valve such that the pressure within the aircraft cabin is controlled in accordance with a predetermined cabin pressure control strategy. Further, the control unit is adapted to control, during flight operation of the aircraft, an effective flow cross-sectional area of the at least one negative relief valve so as to adjust an air flow entering the aircraft cabin through the negative relief valve such that a negative differential pressure between the pressure within the aircraft cabin and an ambient pressure prevailing outside of the aircraft cabin is prevented from exceeding a predetermined threshold value. Moreover, the control unit is adapted to control, during ground operation of the aircraft, the effective flow cross-sectional area of the at least one negative relief valve so as to allow an equalization between the pressure within the aircraft cabin and the ambient pressure prevailing outside of the aircraft.

The control unit may further be adapted to control, during ground operation of the aircraft, the at least one outflow valve into the fully open state so as to allow an equalization of the pressure within the aircraft cabin to the ambient pressure prevailing outside of the aircraft.

Moreover, the control unit may be adapted to control, during ground operation of the aircraft, the effective flow cross-sectional area of the at least one negative relief valve so as so as to ensure that a residual differential pressure between the pressure within the aircraft cabin and the ambient pressure does not exceed 2 hPa.

The negative relief valve may comprise an opening flap comprising a biasing mechanism which is adapted to bias the opening flap into a closed position with a predetermined biasing force. Further, the negative relief valve may comprise a drive mechanism which is adapted to drive, during ground operation of the aircraft, the opening flap into an open position against the biasing force applied to the opening flap by the biasing mechanism.

The at least one outflow valve may comprise an air outflow channel having an acceleration portion being adapted to accelerate the air flow exiting the aircraft cabin through the outflow valve.

The acceleration portion of the outflow channel may be adapted to accelerate the air flow exiting the aircraft cabin through the outflow valve to approximately super-sonic speed. Moreover, the at least one outflow valve may further comprise a control flap which is disposed upstream of the acceleration portion and which is adapted to control the air flow exiting the aircraft cabin and entering the acceleration portion of the outflow channel.

The acceleration portion of the outflow channel may comprise a Venturi pipe.

Preferably, the acceleration portion of the outflow channel is designed in such a manner that a direction of the air flow through the acceleration portion is substantially parallel to a direction of an air flow along an outer surface of an aircraft skin during flight operation of the aircraft.

BRIEF DESCRIPTION OF THE DRAWINGS

Preferred embodiments of the disclosure herein now are described in greater detail with reference to the appended schematic drawings, wherein.

DETAILED DESCRIPTION

Figure 1:
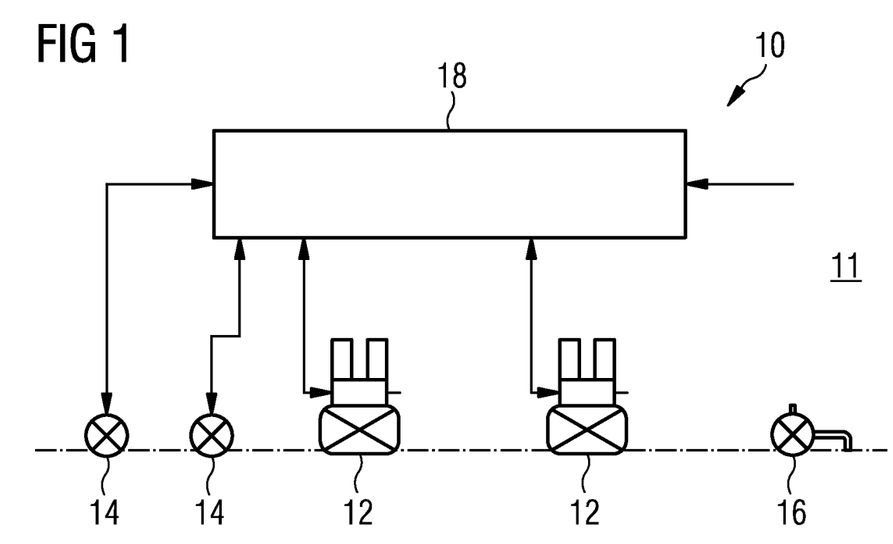
FIG. 1 shows a schematic diagram of a system for controlling the pressure in an aircraft cabin.

A system 10 for controlling the pressure in an aircraft cabin 11, which is shown in FIG. 1, comprises two outflow valves 12, two negative relief valves 14 and an overpressure relief valve 16. Operation of the outflow valves 12 and the negative relief valves 14 is controlled by a control unit 18. During flight operation of the aircraft, an effective flow cross-sectional area of the outflow valves 12 is controlled by the control unit 18 so as to adjust an air flow exiting the aircraft cabin 11 through the outflow valves 12 such that the pressure within the aircraft cabin 11 is controlled in accordance with a predetermined cabin pressure control strategy. In particular, the effective flow cross-sectional area of the outflow valves 12 is increased or decreased as required in order to adjust an actual pressure within the aircraft cabin 11 to a predetermined set pressure value which depends on the actual cruising altitude of the aircraft and which is stored in a memory of the control unit 18.

Further, during flight operation of the aircraft, an effective flow cross-sectional area of the negative relief valves 14 is either passively adjusted or, by the control unit 18, controlled so as to adjust an air flow entering the aircraft cabin 11 through the negative relief valves 14 such that a negative differential pressure between the pressure within the aircraft cabin 11 and an ambient pressure prevailing outside of the aircraft cabin 11 is prevented from exceeding a predetermined threshold value. In particular, in case the ambient pressure, during flight operation of the aircraft, for example during a fast decent of the aircraft, exceeds the cabin pressure, the negative relief valves 14 are controlled into an open state so as to allow ambient air entering the aircraft cabin 11 and to thus provide for an equalization between the (higher) ambient pressure and the (lower) cabin pressure. If, however, during flight operation of the aircraft, the cabin pressure is higher than the ambient pressure, the negative relief valves 14 are kept closed so as to prevent an air exchange between the aircraft cabin 11 and the ambient via the negative relief valves 14.

Finally, the normally closed passive design overpressure relief valve 16, during flight or ground operation of the aircraft, is opened in order to allow air exiting the aircraft cabin 11, if a positive differential pressure between the cabin pressure and the ambient pressure prevailing outside of the aircraft cabin 11, for example due to a failure of the outflow valves 12, exceeds a predetermined threshold value. Otherwise the overpressure relief valve 16 is kept shut.

During ground operation of the aircraft, the effective flow cross-sectional area of the negative relief valves 14, by the control unit 18, is controlled so as to allow an equalization between the pressure within the aircraft cabin 11 and the ambient pressure prevailing outside of the aircraft. In particular, the control unit 18, during ground operation of the aircraft, controls the effective flow cross-sectional area of the negative relief valves 14 in such a manner that a residual differential pressure between the pressure within the aircraft cabin 11 and the ambient pressure does not exceed 2 hPa, a threshold value for the differential pressure between the pressure within the aircraft cabin 11 and the ambient pressure of 2 hPa which complies with existing safety requirements. For example, the negative pressure relief valves 14 may be controlled into a fully open state so as to allow a maximum flow cross-sectional area of the negative pressure relief valves 14 to be flown through.

Simultaneously, also the outflow valves 12 are controlled into their fully open state. Thus, in the system 10 depicted in FIG. 1, during ground operation of the aircraft, mainly the negative relief valves 14 are used for equalizing the pressure within the aircraft cabin 11 and the ambient pressure, the pressure equalization via the negative relief valves 14, however, is supported by the additional air exchange occurring via the also open outflow valves 12. The contribution of the outflow valves 12 to the pressure equalization process is considered by the control unit 18 upon controlling the effective flow cross-sectional area of the negative relief valves 14.

Figure 2:
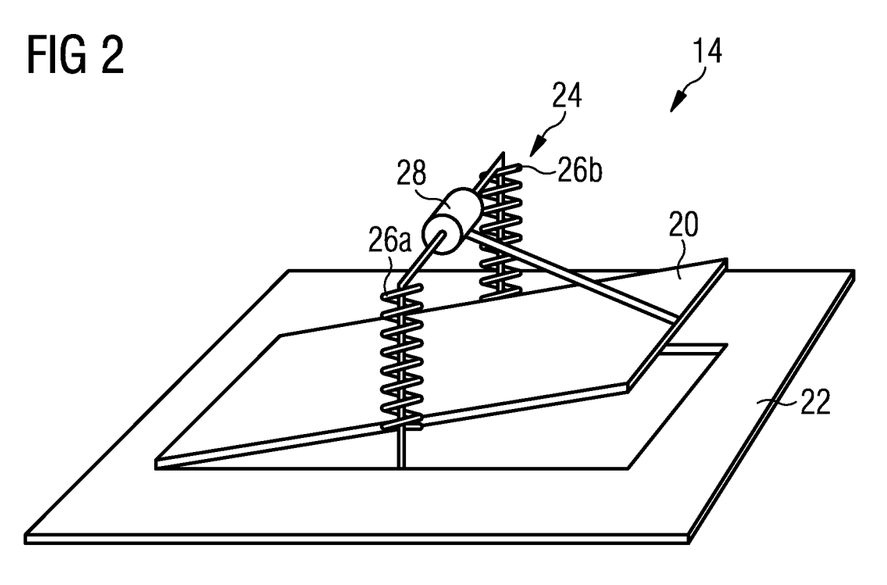
FIG. 2 shows a negative relief valve employed in system according to FIG. 1.

A more detailed view of a negative relief valve 14 employed in the system 10 for controlling the pressure in an aircraft cabin 11 according to FIG. 1 is depicted in FIG. 2. The negative relief valve 14 comprises an opening flap 20 which in its closed position is arranged flush with a region of an aircraft skin 22 surrounding the opening flap 20. In the exemplary embodiment of a negative relief valve 14 according to FIG. 2, the opening flap 20 of the negative relief valve 14, in its open position, extends inwards with respect to the region of the aircraft skin 22 surrounding the opening flap 20, i.e. into an interior of the aircraft. It is, however, also conceivable to provide the negative relief valve 14 with an opening flap 22 which in its open position extends outwards with respect to the region of the aircraft skin 22 surrounding the opening flap 20.

The opening flap 20 of the negative relief valve 14 is biased into a closed position with a predetermined biasing force by a biasing mechanism 24. The biasing mechanism 24 comprises two spring elements 26a, 26b which exert a spring force onto the opening flap 20 so as to urge the opening flap 20 into its closed position. This design of the opening flap 20 ensures that the negative relief valve 14, during flight operation of the aircraft, is closed unless a negative differential pressure between the pressure within the aircraft cabin 11 and the ambient pressure exceeds the spring force exerted onto the opening flap 20 by the spring elements 26a, 26b of the biasing mechanism 24. If, however, a negative differential pressure between the pressure within the aircraft cabin 11 and the ambient pressure exceeds the spring force exerted onto the opening flap 20 by the spring elements 26a, 26b of the biasing mechanism 24, the opening flap 20, due to the higher ambient pressure acting on an outer surface of the opening flap 20 as compared to the lower cabin pressure acting on an inner surface of the opening flap 20, is pivoted inwards as shown in FIG. 2 against the spring force exerted onto the opening flap 20 by the spring elements 26a, 26b of the biasing mechanism 24. Via the thus opened flow cross-sectional area of the negative relief valve 14 ambient air may enter the aircraft cabin 11 so as to provide for a pressure equalization between the aircraft cabin 11 and the ambient.

The negative relief valve 14 further comprises a drive mechanism 28 which, during ground operation of the aircraft, under the control of the control unit 18, drives the opening flap 20 into an open position against the biasing force applied to the opening flap 20 by the biasing mechanism 24. In the embodiment of a negative relief valve 14 shown in FIG. 2, the drive mechanism 28 is adapted to drive the opening flap 20 into a dedicated number of different fixed positions so as to vary the effective flow cross-sectional area of the negative relief valve 14 in a stepwise manner in order to control the pressure equalization process between the aircraft cabin 11 and the ambient as desired. It is, however, also conceivable to equip the negative relief valve 14 with a drive mechanism 28 which is only configured to drive the opening flap 20 between a fully open position and a fully closed position.

Figure 3:
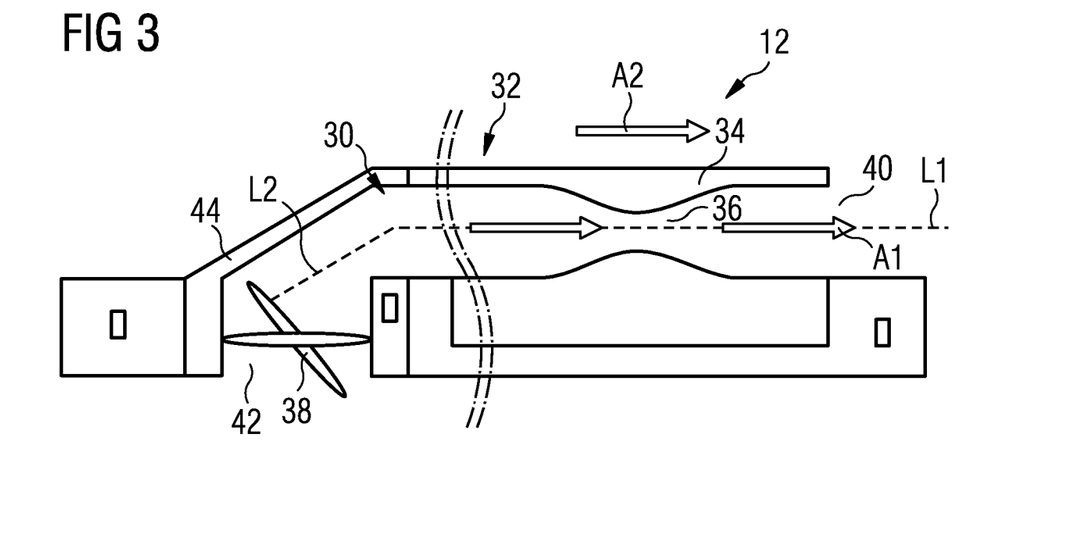
FIG. 3 shows an outflow valve employed in the system according to FIG. 1.

An exemplary embodiment of an outflow valve 12, which suitable for use in the system 10 for controlling the pressure in an aircraft cabin 11 according to FIG. 1, is depicted in FIG. 3. The outflow valve 12 of FIG. 3 comprises an air outflow channel 30 having an acceleration portion 32 which is adapted to accelerate the air flow exiting the aircraft cabin 11 through the outflow valve 12. By accelerating the air flow exiting the aircraft cabin 11 through the outflow valve 12 in the acceleration portion 32 of the outflow channel 30, a thrust recovery function of the outflow valve 12 is realized. In the outflow valve 12 of FIG. 3, the acceleration portion 32 comprises a Venturi pipe 34, i.e. a fixed pipe having a portion 62 with a reduced flow cross-sectional area in a central section thereof. The acceleration portion 32 of the outflow valve 12 depicted in FIG. 3 is adapted to accelerate the air flow exiting the aircraft cabin 11 through the outflow valve 12, upon flowing through the acceleration portion 32, to approximately super-sonic speed.

Further, the outflow valve 12 comprises a control flap 38 which is disposed upstream of the acceleration portion 32 and which serves to control the air flow exiting the aircraft cabin 11 and entering the acceleration portion 32 of the outflow channel 30. The control flap 38 is designed in the form of a butterfly valve which is suitable to optimize the air flow in terms of both aeroacoustics and speed and which, by being continuously movable between different positions so as to vary the effective flow cross-sectional area of the outflow valve 12, allows an active control of the air flow exiting the aircraft cabin 11 and entering the acceleration portion 32 of the outflow channel 30. It is, however, also conceivable to provide the outflow valve 12 with a control flap 38 which can be moved between a fully closed and a fully opened position only.

The acceleration portion 32 of the outflow channel 30 is arranged such that its longitudinal axis L1 extends substantially parallel to the aircraft skin 22. A direction A1 of the air flow through the acceleration portion 32 thus is substantially parallel to a direction A2 of an air flow along an outer surface of an aircraft skin 22 during flight operation of the aircraft. An opening area 40 of the acceleration portion 32 extends substantially perpendicular to the air flow through the acceleration portion 32 thus allowing an unhindered an undeflected air flow out of the acceleration portion 32 into the ambient in order to provide for an effective thrust recovery.

The acceleration portion 32 is connected to an opening 42 provided in the aircraft skin 22 for discharging cabin air from the interior of the aircraft via a connecting portion 44. A longitudinal axis L2 of the connecting portion extends at an angle of approximately 40° relative to the direction of the air flow through the acceleration portion 32. In the connecting portion 44, the cabin air exiting the opening 42 is deflected in order to achieve the desired air flow through the acceleration portion 32 in a direction A1 substantially parallel to the direction A2 of the air flow along an outer surface of an aircraft skin 22 during flight operation of the aircraft.

Since, in the system 10 for controlling the pressure in an aircraft cabin 11, the negative relief valves 14 mainly provide for an equalization between the pressure within the aircraft cabin 11 and the ambient pressure prevailing outside of the aircraft, the outflow valves 12 can be of a small and lightweight design. This allows an advantageous reduction of the weight of the outflow valves 12, and also a reduction of the size of the cut-out which have to be provided in the aircraft outer skin 22 for installation of the outflow valves 22. Further, a more flexible positioning of the outflow valves 22 becomes possible.

Figure 4:
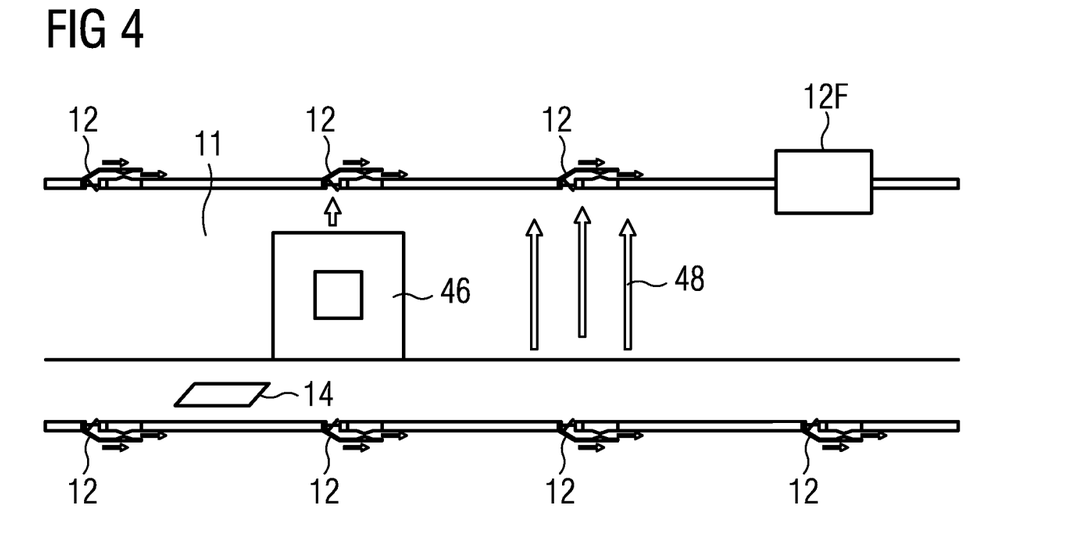
FIG. 4 shows the arrangement of a plurality of outflow valves according to FIG. 3 in an aircraft.

An aircraft therefore can be equipped with a plurality of outflow valves 12 as shown in FIG. 4, without adding too much weight. In the arrangement of FIG. 4 seven outflow valves 12 operating properly and one outflow valve 12F in a faulty operation state is shown. Due to the presence of seven properly operating outflow valves 12 the failure of the faulty outflow valve 12F can be compensated thus increasing the overall system reliability of the cabin pressure control system. Furthermore, since the outflow valves 12 can be positioned in a flexible way, the outflow valves 12 may be placed directly where needed for air extraction in support of aircraft systems other than the cabin pressure control system while ducts and additional conveying structure, such as for example fans can be omitted. In the arrangement of FIG. 4 selected outflow valves 12 serve to extract air from a galley or toilet module 46 while other outflow valves support a cabin displacement ventilation system 48.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling pressure in an aircraft cabin, the method comprising:
   during flight operation of an aircraft, controlling an effective flow cross-sectional area of at least one outflow valve to adjust an air flow exiting the aircraft cabin through the outflow valve, such that the pressure within the aircraft cabin is controlled with a predetermined cabin pressure control strategy;
   during flight operation of the aircraft, controlling an effective flow cross-sectional area of at least one negative relief valve to adjust an air flow entering the aircraft cabin through the negative relief valve, such that a negative differential pressure between the pressure within the aircraft cabin and an ambient pressure prevailing outside of the aircraft cabin is prevented from exceeding a predetermined threshold value; and
   during ground operation of the aircraft, controlling the effective flow cross-sectional area of the at least one negative relief valve, as well as the at least one outflow valve and at least one additional auxiliary valve into a fully open state, to equalize the pressure between the aircraft cabin and the ambient pressure prevailing outside of the aircraft,
   wherein the at least one outflow valve comprises an air outflow channel having an acceleration portion,
   wherein the acceleration portion of the outflow channel has a longitudinal axis that is substantially parallel to an aircraft skin where air flow from the acceleration portion is discharged, such that a direction of air flow through the acceleration portion of the outflow channel is substantially parallel to a direction of an air flow along an outer surface of the aircraft skin during flight operation of the aircraft,
   wherein the acceleration portion of the outflow channel is connected to an external surface of an opening in the aircraft skin, the opening being oriented in a direction that is substantially orthogonal to the direction of the air flow along the outer surface of the aircraft skin at which the opening is formed, and
   wherein the air flow exiting the aircraft cabin and entering the acceleration portion of the outflow channel is controlled by a control flap disposed upstream of the acceleration portion, and
   wherein the negative relief valve has an opening flap which is controlled either stepwise or continuously.

2. The method of claim 1, comprising, during ground operation of the aircraft, controlling the effective flow cross-sectional area of the at least one negative relief valve to ensure that a residual differential pressure between the pressure within the aircraft cabin and the ambient pressure does not exceed 2 hPa.

3. The method of claim 1, comprising:
   biasing the opening flap of the negative relief valve into a closed position with a predetermined biasing force by a biasing mechanism; and
   driving, using a drive mechanism during ground operation of the aircraft, the opening flap into an open position against the predetermined biasing force.

4. The method of claim 1, wherein the air flow exiting the aircraft cabin through the outflow valve, upon flowing through the acceleration portion of the outflow channel, is accelerated to super-sonic speed.

5. The method of claim 1, wherein the opening flap of the negative relief valve opens outwardly from the aircraft skin.

6. A system for controlling pressure in an aircraft cabin, the system comprising:
   at least one outflow valve comprising an air outflow channel, which has an acceleration portion, and a control flap disposed upstream of the acceleration portion;
   at least one negative relief valve configured to provide an air flow entering the aircraft cabin; and
   at least one control unit adapted to control:
      during flight operation of an aircraft:
         an effective flow cross-sectional area of the at least one outflow valve to adjust an air flow exiting the aircraft cabin through the outflow valve, such that the pressure within the aircraft cabin is controlled in accordance with a predetermined cabin pressure control strategy; and
         an effective flow cross-sectional area of the at least one negative relief valve to adjust the air flow entering the aircraft cabin through the negative relief valve, such that a negative differential pressure between the pressure within the aircraft cabin and an ambient pressure prevailing outside of the aircraft cabin is prevented from exceeding a predetermined threshold value; and
      during ground operation of the aircraft:
         the effective flow cross-sectional area of the at least one negative relief valve, as well as the at least one outflow valve and at least one additional auxiliary valve into a fully open state, to equalize the pressure between the aircraft cabin and the ambient pressure prevailing outside of the aircraft,
   wherein the acceleration portion of the outflow channel has a longitudinal axis that is substantially parallel to an aircraft skin where air flow from the acceleration portion is discharged, such that a direction of air flow through the acceleration portion of the outflow channel is substantially parallel to a direction of an air flow along an outer surface of the aircraft skin during flight operation of the aircraft,
   wherein the acceleration portion of the outflow channel is connected to an external surface of an opening in the aircraft skin, the opening being oriented in a direction that is substantially orthogonal to the direction of the air flow along the outer surface of the aircraft skin at which the opening is formed, and wherein the control flap is configured to control the air flow exiting the aircraft cabin and entering the acceleration portion of the outflow channel, and wherein the negative relief valve has an opening flap which is controlled either stepwise or continuously.

7. The system of claim 6, wherein the control unit further is adapted to control, during ground operation of the aircraft, the effective flow cross-sectional area of the at least one negative relief valve so as to ensure that a residual differential pressure between the pressure within the aircraft cabin and the ambient pressure does not exceed 2 hPa.

8. The system of claim 6, wherein the negative relief valve comprises:

a biasing mechanism adapted to bias the opening flap into a closed position with a predetermined biasing force; and a drive mechanism adapted to drive, during ground operation of the aircraft, the opening flap into an open position against the predetermined biasing force.

9. The system of claim 6, wherein the acceleration portion of the outflow channel is adapted to accelerate the air flow exiting the aircraft cabin through the outflow valve to super-sonic speed.

10. The system of claim 6, wherein the acceleration portion of the outflow channel comprises a Venturi pipe.

11. The system of claim 6, wherein the opening flap of the negative relief valve extends outward from the aircraft skin in an open position.

\* \* \* \* \*